US 10,544,318 B2

(12) United States Patent
Ikoshi

(10) Patent No.: US 10,544,318 B2
(45) Date of Patent: Jan. 28, 2020

(54) INKS

(71) Applicant: FUJIFILM CORPORATION, Minato-ku, Tokyo (JP)

(72) Inventor: Masao Ikoshi, New Castle, DE (US)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/129,798

(22) Filed: Sep. 13, 2018

(65) Prior Publication Data

US 2019/0016910 A1    Jan. 17, 2019

Related U.S. Application Data

(63) Continuation of application No. PCT/JP2017/009628, filed on Mar. 9, 2017.

(60) Provisional application No. 62/309,144, filed on Mar. 16, 2016.

(51) Int. Cl.
| | | |
|---|---|---|
| C09D 11/328 | (2014.01) | |
| C09D 11/033 | (2014.01) | |
| C09D 11/037 | (2014.01) | |
| C09D 11/38 | (2014.01) | |
| C09D 11/40 | (2014.01) | |
| B41J 2/21 | (2006.01) | |
| B41M 5/00 | (2006.01) | |

(52) U.S. Cl.
CPC .......... *C09D 11/328* (2013.01); *B41J 2/2107* (2013.01); *B41M 5/0023* (2013.01); *C09D 11/033* (2013.01); *C09D 11/037* (2013.01); *C09D 11/38* (2013.01); *C09D 11/40* (2013.01)

(58) Field of Classification Search
None
See application file for complete search history.

(56) References Cited

U.S. PATENT DOCUMENTS

| | | | |
|---|---|---|---|
| 5,494,733 A | 2/1996 | Koike et al. | |
| 5,584,918 A | 12/1996 | Suzuki et al. | |
| 5,645,631 A | 7/1997 | Koike et al. | |
| 5,698,478 A | 12/1997 | Yamamoto et al. | |
| 5,733,363 A * | 3/1998 | Nagashima | C09B 19/02 |
| | | | 106/31.43 |
| 5,902,387 A | 5/1999 | Suzuki et al. | |
| 6,228,156 B1 | 5/2001 | Higashiyama et al. | |
| 6,254,231 B1 | 7/2001 | Suzuki et al. | |
| 6,284,348 B1 | 9/2001 | Suzuki et al. | |
| 6,394,597 B1 | 5/2002 | Koike et al. | |
| 7,033,423 B2 | 4/2006 | Rolly | |
| 9,909,024 B2 * | 3/2018 | Komatsu | C09D 11/38 |
| 2003/0172840 A1 * | 9/2003 | Blank | D06P 5/30 |
| | | | 106/31.27 |
| 2011/0007110 A1 * | 1/2011 | Shimizu | C09D 11/328 |
| | | | 347/20 |
| 2014/0157530 A1 | 6/2014 | Murai | |
| 2015/0166807 A1 | 6/2015 | Komatsu | |
| 2017/0218214 A1 * | 8/2017 | Oki | B41J 2/01 |
| 2017/0275485 A1 * | 9/2017 | Oki | C09B 62/09 |

FOREIGN PATENT DOCUMENTS

| | | |
|---|---|---|
| CN | 102108641 A * | 6/2011 |
| CN | 102352569 A * | 2/2012 |
| CN | 102352571 A | 2/2012 |
| CN | 105369652 A | 3/2016 |
| CN | 105400292 A | 3/2016 |
| EP | 0617161 A1 | 9/1994 |
| EP | 2740772 A1 | 6/2014 |
| EP | 2957607 A1 | 12/2015 |
| JP | H06-271801 A | 9/1994 |
| JP | 2010-189460 A | 9/2010 |
| JP | 2011-195675 A | 10/2011 |
| JP | 2011-195677 A | 10/2011 |
| JP | 2014133863 A | 7/2014 |
| JP | 2015-117273 A | 6/2015 |
| JP | 2015-117297 A | 6/2015 |
| JP | 2016003282 A | 1/2016 |
| TW | I372775 B1 | 9/2012 |

OTHER PUBLICATIONS

English translation of CN 102352571, Feb. 2012; 8 pages.*
English translation of CN 105400292, Mar. 2016; 9 pages.*
English translation of CN 105369652, Mar. 2016; 12 pages.*
English translation of CN 102352569, Feb. 2012; 10 pages.*
English translation of CN 102108641, Jun. 2011; 9 pages.*
English language translation of the following: Office action dated Jul. 23, 2019 from the JPO in a Japanese patent application No. 2018-566738 corresponding to the instant patent application.
Office action dated Aug. 29 2019 from the IPO in a Indian patent application No. 201847034714 corresponding to the instant patent application.
Inernational Search Report issued in International Application No. PCT/JP2017/009628 dated May 17, 2017.
Written Opinion of the ISA issued in International Application No. PCT/JP2017/009628 dated May 17, 2017.

* cited by examiner

*Primary Examiner* — Helene Klemanski
(74) *Attorney, Agent, or Firm* — Solaris Intellectual Property Group, PLLC

(57) ABSTRACT

A black ink-jet printing ink comprising:
a) from 9 to 11.5 parts of C.I. Reactive Black 39;
b) from 5 to 7.5 parts of C.I. Reactive Brown 11 and/or C.I. Reactive Yellow 95;
c) from 2.5 to 4 parts of C.I. Reactive Orange 12 and/or C.I. Reactive Orange 13;
d) from 0.1 to 10 parts of a buffer;
e) from 15 to 30 parts of ethylene glycol;
f) from 0 to 10 parts of a water miscible solvent;
g) from 0.01 to 2.5 parts of a non-ionic surfactant;
h) from 4 to 14 parts of urea;
i) from 0 to 5 parts of biocide; and
j) the balance to 100 parts water. Also an ink-jet printing process, a multicolour ink-set and printed substrates.

16 Claims, No Drawings

INKS

CROSS-REFERENCE TO RELATED APPLICATIONS

This application is a continuation application of International Application No. PCT/JP/2017/009628, filed Mar. 9, 2017, the disclosure of which is incorporated herein by reference in its entirety. Further, this application claims priority from U.S. Provisional Patent Application No. 62/309,144, filed Mar. 16, 2016, the disclosure of which is incorporated herein by reference in their entirety.

TECHNICAL FIELD

This invention relates to an ink-jet printing ink, a process for ink-jet printing, ink-jet ink containers, ink sets and ink-jet printers.

BACKGROUND ART

Ink-jet printing is a non-impact printing technique in which droplets of an ink are ejected through fine nozzles onto a substrate without bringing the nozzles into contact with the substrate.

Ink-jet printing is increasingly being used in the industrial sector. Industrial ink-jet printers are required to work at high speeds. To achieve this, a print-head for an industrial ink-jet printer will have multiple minute nozzles arranged at a high density to enable high productivity single-pass printing with acceptable print resolutions.

Ink formulation for all forms of ink-jet printing is extremely demanding. It is especially difficult to formulate inks able to reliably work in these high speed single-pass print-heads. The consequences of a blockage or failure of a single one of the tiny nozzles in a commercial ink-jet printer are potentially catastrophic since these print head are designed to work on high throughput media. Thus, a single nozzle not working could result in an unwanted white line appearing on an entire printing output which would then have to be discarded.

This new print-head technology has enabled ink-jet printing to be used in all printing applications including the printing of reactive dyes on to textiles.

The most widely used class of reactive dyes are those which utilise a monochlorotriazine reactive group.

CITATION LIST

Patent Literature

PTL 1: U.S. Pat. No. 5,584,918
PTL 2: U.S. Pat. No. 5,494,733
PTL 3: U.S. Pat. No. 5,645,631
PTL 4: U.S. Pat. No. 5,698,478
PTL 5: U.S. Pat. No. 5,902,387
PTL 6: U.S. Pat. No. 6,228,156
PTL 7: U.S. Pat. No. 6,254,231
PTL 8: U.S. Pat. No. 6,284,348
PTL 9: U.S. Pat. No. 6,394,597
PTL 10: U.S. Pat. No. 7,033,423
PTL 11: U.S. Unexamined Patent Application Publication No. 20140157530
PTL 12: U.S. Unexamined Patent Application Publication No. 20150166807
PTL 13: Japanese Patent Application Laid-Open (JP-A) No. 2010-189460
PTL 14: JP-A No. 2011-195677
PTL 15: JP-A No. 2011-195675
PTL 16: JP-A No. 2015-117297
PTL 17: Chinese Unexamined Patent Application Publication No. 102352571
PTL 18: Taiwanese Patent No. I372775

SUMMARY OF INVENTION

A particular problem associated with dyes of this class is the lack of a good black reactive dye.

To overcome this black reactive dye textile inks are usually based on a navy blue reactive dye shaded by the addition of smaller amounts of other colored reactive dyes.

This can cause a number of problems. Thus, when many black inks are printed at low optical density the shading properties of the minor components can be lost and the true black coloration of the ink compromised.

The black color of the printed dye can also be compromised following the steam and washing steps typically used in reactive dye textile printing.

One of the challenges in using ink printing technology on textiles is to achieve the high optical density and neutral shades which are seen with established processes such as screen print. With current available inks it is not possible to achieve this with a inkjet system, in particular, with a single-pass ink-jet system.

This is because to achieve a high optical density the dye loading must be increased and this results in problems in jetting the ink with the ink becoming either very viscous or even drying in the nozzles resulting in blocked nozzles and jet straightness issues.

However, the applicants have found that by careful selection of the dyes and shading dyes, their relative levels and the solvents and additives in the ink that it is possible to achieve the desired optical density and neutral shades yet still retain an excellent jettability. The inks can be effectively used in any type of print-heads including single-pass print-heads and scanning print heads. In particular, single-pass print-heads are preferred.

Single-pass print-heads with an ink re-circulation system, such as those manufactured by Fujifilm Dimatix, are much more amenable to this type of high solid loading inks than single-pass print-heads without a ink recirculation system, for example the Kyocera KJ4B print-head. However, the ink of the present invention is able to fire through both of these types of print-head without having an adverse effect on their jetting performance.

DESCRIPTION OF THE EMBODIMENTS

Thus, in the present invention, the applicant has developed a black ink-jet printing ink which is not only able to fire reliably through all types of print head, including single-pass print heads and scanning print heads, but also retains good black coloration on dilution and following steam treatment and washing, particularly in single-pass print heads.

Therefore, according to a first aspect of the present invention, there is provided a black ink-jet printing ink comprising:
 a) from 9 to 11.5 parts of C.I. Reactive Black 39;
 b) from 5 to 7.5 parts of C.I. Reactive Brown 11 and/or C.I. Reactive Yellow 95;
 c) from 2.5 to 4 parts of C.I. Reactive Orange 12 and/or C.I. Reactive Orange 13;
 d) from 0.1 to 10 parts of a buffer;
 e) from 15 to 30 parts of ethylene glycol;

f) from 0 to 15 parts of a water miscible solvent;
g) from 0.01 to 2.5 parts of a non-ionic surfactant;
h) from 4 to 14 parts of urea;
i) from 0 to 5 parts of biocide; and
j) the balance to 100 parts water.

All parts and percentages herein (unless stated otherwise) are by weight.

Preferably the total content of components a), b) and c) is greater than 18% with respect to the total amount of the ink. Preferably, the content of component a) is from 9.4 to 11.3%, the total content of component b) is from 5.5 to 7.3%, and the total content of component c) is from 2.7 to 3.6% with respect to the total amount of the ink.

In one preferred embodiment, component b) is C.I. Reactive Brown 11 and component c) is C.I. Reactive Orange 12.

Component d) may be any compatible buffer able to maintain the pH of the ink in the required range of pH 7 to 8.5, examples of such buffers include trishydroxymethylaminomethane (THAM), 4-(2-hydroxyethyl)-1-piperazineethanesulfonic acid (HEPES), morpholinoethanesulfonic acid (MES), carbamoylmethyliminobisacetic acid (ADA), piperazine-1,4-bis(2-ethanesulfonic acid) (PIPES), N-(2-acetamido)-2-aminoethanesulfonic acid (ACES), N,N-bis(2-hydroxyethyl)-2-aminoethanesulfonic acid (BES), N-tris(hydroxymethyl)methyl-2-aminoethanesulfonic acid (TES), phosphate buffer solution, and Tris buffer.

However, preferably, the buffer is a compound of Formula (1):

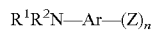 Formula (1)

wherein:
$R^1$ is H or alkyl and $R^2$ is alkyl;
Ar is phenylene;
Z is $SO_3X$ or $CO_2X$
X is H or a cation; and
n is 1 or 2.

Preferably the compound of Formula (1), $R^1$ and $R^2$ are each independently alkyl, or $R^1$ and $R^2$ together with the N atom to which they are attached from a 5- or 6-membered ring. More preferably $R^1$ and $R^2$ are each independently $C_{1-6}$-alkyl, especially ethyl.

When $R^1$ and $R^2$ together with the N atom to which they are attached form a 5- or 6-membered ring, the ring is preferably an optionally substituted morpholine, piperazine or piperidine. Preferred optional substituents are carboxy and sulfo.

Preferably the total number of carbon atoms in $R^1$ and $R^2$ added together is from 3 to 18, more preferably from 3 to 12, especially from 3 to 6.

Ar is preferably phenylene.
Z is preferably $CO_2X$.
X is preferably a cation, more preferably an alkali metal (especially $Na^+$, $K^+$ or $Li^+$), ammonium or substituted ammonium cation.

Examples of compounds of Formula (1) include 4-chloro-N,N-diethylaniline sulfonic acid, N,N-di-n-hexylaniline-3-sulfonic acid, N-ethyl-N-n-hexylaniline disulfonic acids, 2-N,N-diethylaminonaphthalene-6-sulfonic acid, 2-(N-ethyl-N-benzylamino)-toluene-4-sulfonic acid, 2-N,N-diethylaminotoulene-4-sulfonic acid, N-ethyl-N-cyclohexylaniline-sulfonic acid, N-ethyl-N-betahydroxyethylaniline-sulfonic acid, N-ethyl-N-phenylbenzylaminomonosulfonic acid, 2-(N-ethyl-N-phenylamino)-ethanesulfonic acid, 2-(N-butyl-N-phenylamino)ethanesulfonic acid and 4,4'-bis(diethylamino)diphenyl-2,2'-disulfonic acid. Because of their ease of manufacture and efficiency as buffers, the preferred compounds of Formula (1) are the lower N,N-dialkyl-derivatives of metanilic acid (aniline 3-sulfonic acid) and sulfanilic acid (aniline 4-sulfonic acid) especially N,N-diethylmetanilic acid, N,N-diethylsulfanilic acid, or the mixture of the two obtained by the sulfonation of diethylaniline with oleum. N,N-diethylsulfanilic acid is also known as N,N-diethyl-3-sulfoaminobenzene (DEAS).

Preferably component (d), the buffer, the compound of Formula (1) is N,N-diethylsulfanilic acid.

Preferably the buffer is present in an amount of preferably from 0.2 to 5 parts and more preferably of from 0.5 to 2 parts per 100 parts of the ink composition.

Preferably the total content of components e), ethylene glycol (EG), and h), urea, is greater than 20% with respect to the total amount of the ink. Preferably, the content of component e) is from 15 to 26% with respect to the total amount of the ink.

Component f) may be any water-miscible solvent, or mixture of water-miscible solvents, compatible with the other ink components, such as, for example glycerol or a pyrrolidone. Preferably component f) comprises a pyrrolidone and more preferably comprises 2-pyrrolidone.

Preferably, the total content of component f) is from 2.5 to 7.5 parts per 100 parts of the ink.

In one preferred embodiment component f) comprises from 2.5 to 7.5 parts of 2-pyrrolidone per 100 parts of the ink.

Preferably the non-ionic surfactant, component (g) is an acetylenic surfactant.

Any acetylenic surfactant may be used as component (g). However, 2,4,7,9-tetramethyl-5-decyne-4,7-diol and ethylene oxide condensates thereof and 2,5,8,11-tetramethyl-6-dodecyne-5,8-diol and ethylene oxide condensates thereof are preferred.

It is particularly preferred that the acetylenic surfactant is 4,7,9-tetramethyl-5-decyne-4,7-diol or ethylene oxide condensates thereof. It is especially preferred that the acetylenic surfactant is an ethylene oxide condensate of 4,7,9-tetramethyl-5-decyne-4,7-diol. The surfactants 2,4,7,9-tetramethyl-5-decyne-4,7-diol and ethylene oxide condensates thereof are available as the Surfynol (trade name) range of surfactants from Air Products.

Mixtures containing different surfactants may be used.

Component (g) is preferably present in the range of from 0.1 to 1 part per 100 parts of the ink.

Component (h), urea, is preferably present in an amount of from 7 to 12 parts per 100 parts of the ink.

Component (i) the biocide may be any biocide (or mixture of biocides) which is stable in the ink. It is particularly preferred that the biocide comprises 1,2-benzisothiazolin-3-one which is available as a 20% active solution from Lonza as Proxel (trade name) GXL and Bioban (trade name), DXN (2,6-dimethyl-1,3-dioxan-4-yl acetate), from Dow Chemical Company.

The level of biocide in the ink depends on which biocide is used. However, preferably the biocide is present in a range of from 0.01 to 1 part per 100 parts of the ink, by weight.

Preferably the pH of the ink-jet printing ink is in the range of from between pH 6 to 9 and more preferably of from between pH 7 to 8.5.

The ink-jet printing ink preferably has a surface tension of from 20 to 50 dynes/cm, more preferably of from 25 to 50 dynes/cm and especially of from 30 to 40 dynes/cm, when measured at 25° C. using a Kibron AquaPi.

Preferably, the ink-jet printing ink has been filtered through a filter having a mean pore size of less than 10 microns, more preferably less than 5 microns and especially less than 1 micron.

Preferably, the ink-jet printing ink has a total concentration of Ca plus Mg in the ink of less than 300 ppm, more preferably less than 100 ppm and especially less than 50 ppm.

In addition to the above mentioned components, the ink-jet printing ink composition may optionally comprise one or more ink additives. Preferred additives suitable for ink-jet printing inks are anti-kogation agents, rheology modifiers, corrosion inhibitors and chelating agents.

Additional reactive dyes other than dyes of a) to c) may also be added to the black ink-jet printing ink. These additional dyes can in some circumstances further improve the black tone and coloring properties of the black ink-jet printing ink. The additional reactive dye is preferable a monochlorotriazine red dye and more preferably is C.I. Reactive Red 3.1. The additional reactive dye is preferable added in the range of from 0.2 to 5% and more preferably in the range of from 0.5 to 2% with respect to the total amount of the ink.

Preferably, the total amount of additives and additional dyes is no more than 10 parts per 100 parts of the ink, by weight. These additives and additional dyes are added to and comprise part of component (j), the water added to the ink-jet printing ink.

In a preferred embodiment the black ink-jet printing ink comprises:
a) from 9 to 11.5 parts of C.I. Reactive Black 39;
b) from 5 to 7.5 parts of C.I. Reactive Brown 11 and/or C.I. Reactive Yellow 95;
c) from 2.5 to 4 parts of C.I. Reactive Orange 12 and/or C.I. Reactive Orange 13;
d) from 0.2 to 5 parts of N,N-diethylsulfanilic acid;
e) from 15 to 30 parts of ethylene glycol;
f) from 2.5 to 7.5 parts of 2-pyrrolidone;
g) from 0.01 to 1 part of an ethylene oxide condensate of 4,7,9-tetramethyl-5-decyne-4,7-diol;
h) from 4 to 14 parts of urea;
i) from 0 to 5 parts of biocide; and
j) the balance to 100 parts water.

A second aspect of the invention provides an ink-jet printing process wherein the ink-jet printing ink according to the first aspect of the invention is printed onto a substrate by means of an ink-jet printer.

The process of the present invention may use any ink-jet printer, preferably with a single-pass print-head.

Thus the second aspect of the invention provides an ink-jet printing process wherein the ink according the first aspect of the invention is printed onto a substrate using an ink-jet printer with single-pass print-head.

One preferred type of single-pass print-head has an ink re-circulation channel in the ink supply system. This channel allows for fresh ink to be available for jetting and can be part of the ink supply system or even specially engineered channels which run behind the nozzle plate. It is preferred that the ink supply system runs behind the nozzle plate as this allows for the use of more volatile inks whilst not compromising restart/latency behaviour. Print-heads of this type are available from Fujifilm Dimatix.

Recirculating print-heads are usually equipped with a reservoir heater and a thermistor to control the jetting temperature. It is preferred that the viscosity of the ink-jet printing ink at the jetting temperature is in the range of from 3 to 20 mPa*s and more preferably in a range of from 4 to 12 mPa*s. Viscosity is as would be measured using a Brookfield measured with using a Brookfield DV-2T digital viscometer with UL-adapter and water jacket and spindle SC4-18 at 150 rpm.

Thus in a first preferred embodiment of the second aspect of the invention the ink-jet printer has a single-pass ink recirculating print-head.

A second preferred type of single-pass print head is a non-recirculating print-head. Print-heads of this type are available from Kyocera.

Non-recirculating print-heads are also usually equipped with a reservoir heater and a thermistor to control the jetting temperature. It is preferred that the viscosity of the ink-jet printing ink at the jetting temperature for print-heads of this type are in the range of from 4 to 7 mPa*s.

Thus in a second preferred embodiment of the second aspect of the invention the ink-jet printer has a single-pass ink non-recirculating print-head.

Preferably the ink-jet printing ink of the first aspect of the invention is applied at a temperature in excess of 30° C.

The substrate is preferably paper, plastic, metal or glass and more preferably a textile material.

The textile material may be of natural or synthetic fibers including blends thereof. Thus, it may be cellulose, including viscose rayon and regenerated viscose rayon, wool, acrylic, polyamide such as nylon, polyester such as polyethyleneglycolterephthalate or polyurethane. It is, however, preferably cellulose or a blend thereof.

The textile material is preferably woven or knitted or in the form of dry or wet laid fibers. It may be in the form of sheets, webs, threads or ready made up garments such as drapes, shirting, toweling, underwear, socks and sheeting.

Preferably the textile material has been impregnated with a pre-treatment composition comprising components such as a color enhancing agent; an alkali metal hydroxide, carbonate, bicarbonate or a mixture thereof; a thickener, such as sodium alginate and water.

In the textile printing process according to the second aspect of the invention, if the textile material has not been impregnated with a pre-treatment agent to enhance the dyeing process, then a pre-treatment step may be performed.

The pre-treatment step requires that the textile material is treated with a pre-treatment liquid containing at least one of an alkali agent, such as sodium carbonate, sodium hydrogen carbonate, sodium hydroxide, trisodium phosphate, and sodium acetate, and a hydrotropic agent such as urea.

The pre-treatment liquid may also contain a sizing agent, for example: starch materials such as corn and wheat; cellulose based materials such as carboxymethyl cellulose and hydroxymethyl cellulose; polysaccharides such as sodium alginate, gum arabic, locust bean gum, gum tragacanth, guar gum, and tamarind seed; proteins such as gelatin and casein; natural water-soluble polymers such as tannin and lignin; and synthetic water-soluble polymers such as polyvinyl alcohol-based compounds, polyethylene oxide-based compounds, acrylic acid-based compounds, and maleic anhydride-based compounds.

Other components which may be present in the pre-treatment liquid include an anti-reduction agent, a preservative, a fungicide, a chelating agent, a pH adjusting agent, a thickening agent such as an alginate and a surfactant The exact composition of the pre-treatment liquid will depend on the printing regime and nature of the textile material.

The pre-treatment liquid may be applied to the textile material by any suitable method. Thus, the textile material may be immersed in the pre-treatment liquid, coated by means of a pad batch method, roll coater or the like, sprayed, or applied by an ink-jet printer.

The pre-treated textile material may be then allowed to dry.

In the process of the second aspect of the invention the textile material is printed using an ink-jet printer with a single-pass print-head as described above.

Following the printing step the printed textile material is preferably subjected to a heat treatment step in order to enhance fixation of dyes to the textile material. The heat treatment step may utilize any method known in the art such as a high temperature steaming or high pressure steaming. To minimise any possible damage to the textile material the temperature in the heat treatment step is preferably in a range of from 90° C. to 110° C.

Following the heat treatment step the printed textile material may be washed to remove any excess dye. The washing step uses water though soaping treatment may be used in some instances.

Thus, a preferred an ink-jet printing process of the second aspect of the invention is textile material printing process comprising the following steps:
a) optionally pre-treating a textile material;
b) ink-jet printing the textile material, preferably using an ink-jet printer with a single-pass print-head, as described and preferred above;
c) optionally heat treating the printed textile material;
d) optionally washing the heat treated printed textile material.

A third aspect of the present invention provides a substrate printed by an ink-jet printing process as described in the second aspect of the invention using an ink-jet printing ink as described in the first aspect of the invention. This substrate is as described and preferred in the second aspect of the invention. Thus, the preferred printed substrate is a textile material.

According to a fourth aspect of the present invention there is provided an ink-jet printer ink container (e.g. a cartridge or a larger ink tank), comprising a black ink-jet printing ink as described in the first aspect of the present invention.

A fifth aspect of the present invention provides an ink-jet printer with a single-pass print-head, as described in the second aspect of the invention, containing a black ink-jet printing ink, as described in the first aspect of the invention.

A sixth aspect of the invention provides a multicolour ink-set comprising a black ink-jet printing ink as described in the first aspect of the invention.

A seventh aspect of the invention provides an ink-jet printer ink container tank comprising a black ink-jet printing ink as described in the first aspect of the invention.

A eighth aspect of the invention provides an ink-jet printer with a single-pass print-head containing a black ink-jet printing ink, as described in the first aspect of the invention.

Preferably in addition to the black ink-jet printing ink as described in the first aspect of the invention the multicolour ink-set comprises a cyan ink-jet printing ink, a yellow ink-jet printing ink and a magenta ink-jet printing ink, and optionally other coloured ink-jet printing inks such as red, green and orange.

EXAMPLES

The present invention will now be illustrated by the following examples in which all parts are by weight unless stated to the contrary.

1,2-Benzisothiazolin-3-one was obtained as Proxel (trade name) GXL (20% solution) from Lonza. GXL was used in the examples and references in an amount of 0.075 parts per 100 parts of the ink.

Surfynol (Registered Trademark) 465 is an ethylene oxide condensate of 4,7,9-tetramethyl-5-decyne-4,7-diol from Air Products.

DEAS is N,N-diethylsulfanilic acid.

Reactive Black 39, Reactive Orange 12, Reactive Yellow 95 and Reactive Orange 13 were obtained from Dystar.

Reactive Brown 11 was obtained from Lakhani Dyestuffs Pvt Ltd.

The ink compositions shown in Table 1 (inks of the invention 1 to 22) and comparative ink compositions shown in Table 2 (inks of reference 1 to 14) were prepared, filtered through a 1.0 µm pore size membrane and evaluated using the following test protocols.

1. Print OD and Colour Shade

A pre-treatment solution containing 66.3% water, 20.0% urea, 12.0% soda-ash and 1.7% sodium alginate was prepared and filtered through a 10 µm pore size membrane filter. The pre-treatment solution was applied to the front and back of a 100% cotton fabric by Pad Batch (60% wet pick-up) and dried at ambient condition overnight.

The substrate was printed with the inks of the invention 1 to 22 or the inks of reference 1 to 14 using a printer with a Fujifilm Dimatix Samba single-pass print head. Four different drop volumes (2.5 pl, 5.3 pl, 7.0 pl, 13.0 pl) were applied at 100% duty solid image (1200×1200 dpi). The printed samples were dried at 25° C. for 30 min. The samples were then steam treated at 100° C. for 10 min. They were then washed with cold water for 2 min, with 90° C. hot water for 10 min and finally with cold water for 2 min. The samples were then allowed to dry at room temperature.

The optical properties of the black printed substrate (OD, L*, a* and b*) were then measured with a X-Rite eXact (manufactured by X-Rite, Inc.). The prints were evaluated as follows:

Optical Density
AA: OD of 13.0 pl sample is higher than 1.60
A: OD of 13.0 pl sample is from 1.55 to 1.60
B: OD of 13.0 pl sample is from 1.50 to 1.54
C: OD of 13.0 pl sample is from 1.45 to 1.49
D: OD of 13.0 pl sample lower than 1.45

Colour Shade

The C (Chroma) of print samples were calculated and evaluated as follows:

$$C=(a^{*2}+b^{*2})^{1/2}, C_{max} \text{ maximum number of } C_{2.5\ pl}, C_{5.3\ pl}, C_{7.0\ pl}, C_{13.0\ pl}$$

AA: $C_{max}<2.0$
A: $2.0 \leq C_{max}<4.0$
B: $4.0 \leq C_{max}<6.0$
C: $6.0 \leq C_{max}<8.0$
D: $8.0 \leq C_{max}$ 2. Jetting Failure by Drying (Open Cap Evaluation)

The substrate (what substrate) was printed with the inks of the invention 1 to 22 or the inks of reference 1 to 14 using a printer with a single-pass Kyocera KJ4B print-head (drop volume of 4.5 pl).

An initial print on HP Advanced Photo Paper (trade name) of the nozzle check image of all 2656 nozzles was carried out. The print-head was then left uncapped for 30 min before nozzle check image was reprinted and the delay of jets after firing signals was determined. This delay is defined as D (mm).

A: $D \leq 1.0$ mm
B: 1.0 mm $D \leq 2.5$ mm
C: 2.5 mm $D \leq 5.0$ mm
D: 5.0 mm $\leq D$ and/or more than 10 nozzles of miss jets

3. Ink Stability

The viscosity at 32° C. (measured with using a Brookfield DV-2T) and pH of a freshly prepared ink (inks of the invention 1 to 22 or inks of reference 1 to 14) were measured. The ink was then stored in a sealed container for 7 days at 60° C. and the viscosity at 32° C. and pH re-measured.

A physical properties changing ratio (R) was then determined as follows:

$$R_{viscosity} = (Viscosity_{60\square 7d} - Viscosity_{Fresh})/Viscosity_{Fresh} \times 100(\%)$$

$$R_{pH} = (pH_{60\square 7d} - pH_{Fresh})/pH_{Fresh} \times 100(\%)$$

A: Both $R_{viscosity}$ and $R_{pH}$ are less than 10%
B: Both $R_{viscosity}$ and $R_{pH}$ are from 10% to 20%
C: Both $R_{viscosity}$ and $R_{pH}$ are more than 20%

4. Colour Shade Change

Print samples on a cotton substrate prepared as described in protocol 1, above, were prepared using freshly made ink and ink aged for 7 days at 60° C. as described above. The optical properties of the printed substrates (OD, L*, a* and b*) were then measured with a X-Rite eXact (manufactured by X-Rite, Inc.). The change in the color shade ΔE was then calculated as shown below.

$$\Delta E = \{(L_{60\square 7d}^* - L_{Fresh}^*)^2 (a_{60\square 07d}^* - a_{Fresh}^*)^2 + (b_{60\square 7d}^* - b_{Fresh}^*)^2\}^{1/2}$$

A: ΔE≤3.0
B: 3.0≤ΔE<6.0
C: 6.0≤ΔE

TABLE 1

| | Our Invention | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| ReactiveBlack 39 | 11.1% | 11.1% | 11.1% | 10.0% | 10.0% | 10.0% | 10.0% | 10.0% | 10.0% | 10.0% | 10.0% | 10.0% |
| Reactive Brown 11 | 5.6% | 5.6% | 5.6% | 5.7% | 5.7% | 5.7% | 5.7% | 5.7% | 5.7% | 5.7% | 7.3% | 5.1% |
| Reactive Yellow 95 | 0.5% | 1.6% | 1.6% | — | — | — | — | — | — | — | — | — |
| Reactive Orange 12 | 3.0% | 3.0% | 3.1% | 3.6% | 3.6% | 3.6% | 3.0% | 3.6% | 3.6% | 3.6% | 3.0% | 3.0% |
| Reactive Orange 13 | — | 0.4% | 0.4% | — | — | — | — | — | — | — | — | — |
| urea | 10% | 5% | 5% | 5% | 10% | 5% | 10% | 5% | 8% | 10% | 10% | 10% |
| EG | 16% | 18% | 23% | 23% | 18% | 18% | 18% | 26% | 23% | 21% | 18% | 18% |
| DEG | — | — | — | — | — | — | — | — | — | — | — | — |
| Glycerine | — | — | — | — | — | 5% | — | — | — | — | — | — |
| 2 pyrrolidone | 5% | 5% | 5% | 5% | 5% | 5% | 5% | 5% | 5% | 5% | 5% | 5% |
| Surfynol 465 | 0.6% | 0.6% | 0.6% | 0.6% | 0.6% | 0.6% | 0.6% | 0.6% | 0.6% | 0.6% | 0.6% | 0.6% |
| DEAS @100% | 1% | 1% | 1% | 1% | 1% | 1% | 1% | 1% | 1% | 1% | 1% | 1% |
| Deionized water | Balance to 100% | Balance to 100% | Balance to 100% | Balance to 100% | Balance to 100% | Balance to 100% | Balance to 100% | Balance to 100% | Balance to 100% | Balance to 100% | Balance to 100% | Balance to 100% |
| total of Ca and Mg(ppm) | 20 ppm | 20 ppm | 20 ppm | 20 ppm | 20 ppm | 20 ppm | 20 ppm | 20 ppm | 20 ppm | 20 ppm | 21 ppm | 19 ppm |
| Print OD | AA | AA | AA | A | A | A | A | A | A | A | A | A |
| Colour shade (neutral) | A | A | A | A | A | A | AA | A | A | A | B | B |
| Jetting (open time) | B | B | A | B | A | A | A | A | A | A | B | A |
| Ink stability | A | A | A | A | A | A | A | A | A | A | A | A |
| Colour shade (60° C. 1 w ink) | A | A | A | A | A | A | A | A | A | A | A | A |

| | Our Invention | | | | | | | | | |
|---|---|---|---|---|---|---|---|---|---|---|
| | 13 | 14 | 15 | 16 | 17 | 18 | 19 | 20 | 21 | 22 |
| ReactiveBlack 39 | 10.0% | 10.0% | 9.4% | 11.3% | 9.4% | 11.3% | 10.0% | 10.0% | 10.0% | 10.0% |
| Reactive Brown 11 | 5.7% | 5.7% | 5.7% | 5.7% | 5.1% | 7.3% | 5.7% | 5.7% | 5.7% | 5.7% |
| Reactive Yellow 95 | — | — | — | — | — | — | — | — | — | — |
| Reactive Orange 12 | 3.8% | 2.7% | 3.0% | 3.0% | 2.7% | 3.6% | 3.0% | 3.0% | 3.0% | 3.0% |
| Reactive Orange 13 | — | — | — | — | — | — | — | — | — | — |
| urea | 10% | 10% | 10% | 10% | 10% | 10% | 10% | 10% | 10% | 10% |
| EG | 18% | 18% | 18% | 18% | 20% | 16% | 18% | 18% | 18% | 18% |
| DEG | — | — | — | — | — | — | — | — | — | — |
| Glycerine | — | — | — | — | — | — | — | — | — | — |
| 2 pyrrolidone | 5% | 5% | 5% | 5% | 5% | 5% | 5% | 5% | 5% | 5% |
| Surfynol 465 | 0.6% | 0.6% | 0.6% | 0.6% | 0.6% | 0.6% | 0.6% | 0.6% | 0.6% | 0.6% |
| DEAS @100% | 1% | 1% | 1% | 1% | 1% | 1% | — | 1% | 1% | 1% |
| Deionized water | Balance to 100% | Balance to 100% | Balance to 100% | Balance to 100% | Balance to 100% | Balance to 100% | Balance to 100% | Balance to 100% | Balance to 100% | Balance to 100% |
| total of Ca and Mg(ppm) | 20 ppm | 19 ppm | 19 ppm | 21 ppm | 18 ppm | 23 ppm | 19 ppm | 137 ppm | 78 ppm | 350 ppm |
| Print OD | A | A | A | AA | B | AA | A | A | A | A |
| Colour shade (neutral) | B | B | B | B | A | A | AA | AA | AA | AA |
| Jetting (open time) | B | A | A | B | A | B | A | B | B | B |
| Ink stability | A | A | A | A | A | A | B | B | A | B |
| Colour shade (60° C. 1 w ink) | A | A | A | A | A | A | B | A | A | A |

TABLE 2

| | Reference | | | | | | | |
|---|---|---|---|---|---|---|---|---|
| | 1 | 2 | 3 | 4 | 5 | 6 | 7 | 8 |
| ReactiveBlack 39 | 10.0% | 10.0% | 11.0% | 12.0% | 10.0% | 10.0% | 10.0% | 10.0% |
| Reactive Brown 11 | — | 5.7% | 5.7% | 5.7% | 8.0% | 4.0% | 5.7% | 5.7% |
| Reactive Yellow 95 | — | — | — | — | — | — | — | — |
| Reactive Orange 12 | — | 2.0% | 2.0% | 2.0% | 3.0% | 3.0% | 3.0% | 3.0% |
| Reactive Orange 13 | — | — | — | — | — | — | — | — |
| urea | 10% | 10% | 10% | 10% | 10% | 10% | 3% | 10% |
| EG | 18% | 18% | 18% | 18% | 18% | 18% | 18% | 13% |
| DEG | — | — | — | — | — | — | — | — |
| Glycerine | — | — | — | — | — | — | — | — |
| 2 pyrrolidone | 5% | 5% | 5% | 5% | 5% | 5% | 5% | 5% |
| Surfynol 465 | 0.6% | 0.6% | 0.6% | 0.6% | 0.6% | 0.6% | 0.6% | 0.6% |
| DEAS @100% | 1% | 1% | 1% | 1% | 1% | 1% | 1% | 1% |
| Deionized water | Balance to 100% | Balance to 100% | Balance to 100% | Balance to 100% | Balance to 100% | Balance to 100% | Balance to 100% | Balance to 100% |
| total of Ca and Mg(ppm) | 10 ppm | 18 ppm | 19 ppm | 20 ppm | 22 ppm | 18 ppm | 19 ppm | 19 ppm |
| Print OD | D | B | A | AA | A | A | A | A |
| Colour shade (neutral) | D | C | C | D | C | C | A | A |
| jetting (open time) | A | A | A | A | A | A | C | C |
| ink stability | A | A | A | A | A | A | A | A |
| Colour shade (60° C. 1 w ink) | A | A | A | A | A | A | A | A |

| | Reference | | | | | |
|---|---|---|---|---|---|---|
| | 9 | 10 | 11 | 12 | 13 | 14 |
| ReactiveBlack 39 | 10.0% | 10.0% | 10.0% | 10.0% | 10.0% | 10.0% |
| Reactive Brown 11 | 5.7% | 5.7% | 5.7% | 5.7% | 3.0% | — |
| Reactive Yellow 95 | — | — | 1.0% | — | — | — |
| Reactive Orange 12 | 3.0% | 3.0% | 2.0% | 3.0% | 2.0% | 2.0% |
| Reactive Orange 13 | — | — | 0.4% | — | — | 3.0% |
| urea | 3% | — | 5% | 10% | 10% | 10% |
| EG | — | 18% | 23% | — | 25% | 25% |
| DEG | — | — | — | 18% | — | — |
| Glycerine | 18% | 10% | — | — | — | — |
| 2 pyrrolidone | 5% | 5% | 5% | 5% | 5% | 5% |
| Surfynol 465 | 0.6% | 0.6% | 0.6% | 0.6% | 0.6% | 0.6% |
| DEAS @100% | 1% | 1% | 1% | 1% | 1% | 1% |
| Deionized water | Balance to 100% | Balance to 100% | Balance to 100% | Balance to 100% | Balance to 100% | Balance to 100% |
| total of Ca and Mg(ppm) | 19 ppm | 19 ppm | 20 ppm | 19 ppm | 16 ppm | 16 ppm |
| Print OD | B | B | AA | B | C | C |
| Colour shade (neutral) | A | A | AA | A | C | D |
| jetting (open time) | D | C | C | C | A | A |
| ink stability | A | A | A | A | A | A |
| Colour shade (60° C. 1 w ink) | A | A | A | A | A | A |

The disclosure of U.S. 62/309,144 is incorporated herein by reference in its entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. A black ink-jet printing ink comprising:
   a) from 9 to 11.5 parts of C.I. Reactive Black 39;
   b) from 5 to 7.5 parts of C.I. Reactive Brown 11 and/or C.I. Reactive Yellow 95;
   c) from 2.5 to 4 parts of C.I. Reactive Orange 12 and/or C.I. Reactive Orange 13;
   d) from 0.1 to 10 parts of a buffer;
   e) from 15 to 30 parts of ethylene glycol;
   f) from 0 to 15 parts of a water miscible solvent;
   g) from 0.01 to 2.5 parts of a non-ionic surfactant;
   h) from 4 to 14 parts of urea;
   i) from 0 to 5 parts of biocide; and
   j) the balance to 100 parts water.

2. The ink-jet printing ink as claimed in claim 1 wherein the total amount of components e) and h) is greater than 20% by weight.

3. The ink-jet printing ink as claimed in claim 1, wherein the total amount of components a), b) and c) is greater than 18% by weight.

4. The ink-jet printing ink according to claim 1, wherein in component (d), the buffer is a compound of Formula (1):

Formula (1)

wherein:

R$^1$ is H or alkyl and R$^2$ is alkyl;

Ar is phenylene;

Z is SO$_3$X or CO$_2$X

X is H or a cation; and n is 1 or 2.

5. The ink-jet printing ink according to claim 1, wherein the buffer is N,N-diethylsulfanilic acid.

6. The ink-jet printing ink according to claim 1, wherein component (g), the non-ionic surfactant, is an ethylene oxide condensate of 4,7,9-tetramethyl-5-decyne-4,7-diol.

7. The ink-jet printing ink according to claim 1, wherein the total concentration of Ca and Mg in the ink is less than 300 ppm.

8. The black ink-jet printing ink according to claim 1 comprising:
   a) from 9 to 11.5 parts of C.I. Reactive Black 39;
   b) from 5 to 7.5 parts of C.I. Reactive Brown 11 and/or C.I. Reactive Yellow 95;
   c) from 2.5 to 4 parts of C.I. Reactive Orange 12 and/or C.I. Reactive Orange 13;
   d) from 0.2 to 5 parts of N,N-diethylsulfanilic acid;
   e) from 15 to 30 parts of ethylene glycol;
   f) from 2.5 to 7.5 parts of 2-pyrrolidone;
   g) from 0.01 to 1 parts of an ethylene oxide condensate of 4,7,9-tetramethyl-5-decyne-4,7-diol;
   h) from 4 to 14 parts of urea;
   i) from 0 to 5 parts of biocide; and
   j) the balance to 100 parts water.

9. An ink-jet printing process wherein the ink-jet printing ink according to claim 1 is printed onto a substrate using an ink-jet printer.

10. An ink-jet printing process according to claim 9, wherein the ink-jet printer comprises a single-pass print-head.

11. An ink-jet printing process according to claim 10 wherein the ink-jet printer has a single-pass ink recirculating print-head.

12. An ink-jet printing process according to claim 10 wherein the inkjet printer has a single-pass non-recirculating print-head.

13. An ink-jet printing process according to claim 9, which is a textile material printing process comprising the following steps:
   a) optionally pre-treating a textile material;
   b) ink-jet printing the textile material;
   c) optionally heat treating the printed textile material;
   d) optionally washing the heat treated printed textile material.

14. A substrate printed by an ink-jet printing process as described in claim 9.

15. A substrate as claimed in claim 14 which is a printed textile material.

16. A multicolour ink-set comprising a black ink-jet printing ink as defined in claim 1.

* * * * *